United States Patent
Brenner et al.

[11] Patent Number: 5,973,415
[45] Date of Patent: Oct. 26, 1999

[54] CAPACITANCE LEVEL SENSOR

[75] Inventors: Raul Brenner, Evanston; Alex J. Esin, Buffalo Grove; Lawrence J. Jones, West Dundee; Boris Rosselson, Buffalo Grove, all of Ill.

[73] Assignee: Kay-Ray/Sensall, Inc., Mt. Prospect, Ill.

[21] Appl. No.: 08/920,293

[22] Filed: Aug. 28, 1997

[51] Int. Cl.$^6$ ................................................ H01H 35/00
[52] U.S. Cl. ......................... 307/118; 307/125; 324/686; 324/690; 324/689; 324/688; 340/870.37
[58] Field of Search ................................... 307/112, 116, 307/118, 125, 126, 130, 131; 340/540, 603, 606, 612, 616, 618, 635, 657, 620, 622, 870.37; 361/42, 78, 88, 91, 93, 111, 115, 160, 161, 162, 170; 324/686, 689, 690, 688, 663, 658

[56] References Cited

U.S. PATENT DOCUMENTS

| | | | |
|---|---|---|---|
| 3,706,980 | 12/1972 | Maltby | 340/244 |
| 3,781,672 | 12/1973 | Maltby et al. | 324/61 |
| 3,879,644 | 4/1975 | Maltby | 317/246 |
| 3,993,947 | 11/1976 | Maltby et al. | 324/60 |
| 4,025,846 | 5/1977 | Franz et al. | 324/61 |
| 4,146,834 | 3/1979 | Maltby et al. | 324/60 |
| 4,166,388 | 9/1979 | Sun et al. | 73/304 |
| 4,208,909 | 6/1980 | Maltby et al. | 73/304 |
| 4,232,300 | 11/1980 | Wright et al. | 340/840.39 |
| 4,245,188 | 1/1981 | Rottmar | 324/61 |
| 4,347,740 | 9/1982 | Townsend | 73/304 |
| 4,347,741 | 9/1982 | Geiger | 73/304 |
| 4,499,640 | 2/1985 | Brenton et al. | 29/25.41 |
| 4,499,641 | 2/1985 | Fleckenstein | 29/25.41 |
| 4,515,015 | 5/1985 | Kuhlman | 73/304 |
| 4,549,245 | 10/1985 | Fleckenstein | 361/284 |
| 4,551,785 | 11/1985 | Kröner | 361/284 |
| 4,676,100 | 6/1987 | Eichberger | 324/61 |
| 4,683,418 | 7/1987 | Wagner et al. | 324/61 |
| 4,723,122 | 2/1988 | Maltby et al. | 340/870.38 |
| 4,757,252 | 7/1988 | Maltby et al. | 327/61 |
| 4,809,129 | 2/1989 | Hansen, III et al. | 361/284 |
| 4,811,160 | 3/1989 | Fleckenstein | 361/284 |
| 4,833,393 | 5/1989 | Wetzel | 324/60 |
| 4,914,377 | 4/1990 | Russell | 324/690 |
| 4,977,786 | 12/1990 | Davis | 73/864.24 |
| 5,048,335 | 9/1991 | Marsh et al. | 73/304 |
| 5,049,878 | 9/1991 | Stern | 340/870.4 |
| 5,083,470 | 1/1992 | Davis et al. | 73/864.24 |
| 5,121,632 | 6/1992 | Keeler et al. | 73/304 |
| 5,245,873 | 9/1993 | Fathauer et al. | 73/304 |
| 5,307,678 | 5/1994 | Cost | 73/304 |
| 5,451,940 | 9/1995 | Schneider et al. | 340/870.37 |
| 5,495,130 | 2/1996 | Schneider | 307/118 |
| 5,539,670 | 7/1996 | Maltby et al. | 364/550 |
| 5,546,005 | 8/1996 | Rauchwerger | 324/688 |
| 5,600,997 | 2/1997 | Kemp et al. | 340/621 |

*Primary Examiner*—Fritz Fleming
*Assistant Examiner*—Peter Zura
*Attorney, Agent, or Firm*—Westman, Champlin & Kelly, P.A.

[57] ABSTRACT

A capacitive level sensor for sensing level of a in a vessel includes a sensor coupled to the vessel having a shield and an inner sensing rod. An oscillator provides an RF signal to the shield and the sensing rod. Comparison circuitry couples to the sensing rod provides a wet/dry output in response to capacitance between the inner sensing rod and the vessel, the capacitance related to the level of the liquid in the vessel.

21 Claims, 4 Drawing Sheets

CAPACITANCE LEVEL SENSOR

BACKGROUND OF THE INVENTION

The present invention relates to level sensors of the type used in the process control industry. More specifically, the present invention relates to capacitive level sensors which provide an output to, and receive power from, same two wire process control loop (can be relay output as well).

Process control loops are frequently used in industrial processes to control the process. One type of sensor that can be coupled to such a loop is a level sensor, and specifically a capacitive based liquid level sensor. Such sensors detect a wet or a dry condition by measuring the capacitance between a test probe (or sensor rod) and electrical ground. When the test probe is covered with liquid, an RF signal is more easily conducted to electrical ground. This is detected and an output is provided indicating a wet condition.

However, over the life of the sensor, it is known that coatings, and in particular conductive coatings, can build up on the sensing rod and lead to inaccurate readings. One known solution is to provide a shield which partially surrounds the sensing rod and is driven to the same electrical potential as the sensing rod. This creates an electrically neutral zone between the shield and the sensing rod to thereby reduce the effect of a conductive coating on the sensor. Various capacitive liquid level sensors are shown in Geiger, U.S. Pat. No. 4,347,741 issued Sep. 7, 1982, Kuhlman, U.S. Pat. No. 4,515,015 issued May 7, 1985 and Marsh et al. U.S. Pat. No. 5,048,335 issued Sep. 17, 1991.

SUMMARY OF THE INVENTION

A capacitive level sensor for sensing level of a liquid or solid in a vessel includes a sensor coupled to the vessel having a shield and an inner sensing rod. An oscillator provides an RF output to the shield and the inner sensing rod. Comparison circuitry coupled to the inner sensing rod provides a wet/dry output in response to a capacitance between the inner sensing rod and the vessel due to the liquid. In one aspect of the invention, the oscillator includes an enable input for controlling generation of the RF output and a pulse source periodically providing an enable signal to the enable input of the oscillator. In another aspect of the invention, a first transformer has a primary coil coupled to the RF output of the oscillator and a secondary coil coupled between an outer tube of the sensor and to the shield. A second transformer includes a primary coil coupled between the shield and the inner rod and a secondary coil providing an output which is coupled to comparison circuitry. Further aspects of the invention include adjustable calibration signal generation circuitry and offset generation circuitry. Another aspect of the invention is the use of an expansion collar to maintain seal integrity of an elongated sensor probe in a capacitive liquid level sensor.

DETAILED DESCRIPTION OF THE PREFERRED EMBODIMENTS

The present invention provides a capacitive level sensor well suited for use in low power environments such as two wire process control loops. One problem with prior art designs was that if an excessive coating of conductive material formed on the sensor and the associated driven shield, a relatively large amount of power was required to drive the shield to maintain the electrically neutral zone layer between. Eventually the circuitry in the prior art was not capable of driving the shield and the entire sensor would fail or need to be shut down for maintenance.

In the present invention, the sensor is driven using a pulsed RF signal in which the pulses have a duty cycle which is less than 100%. Further, as the pulsed signal is gated and only periodically applied to the sensor to thereby further reduce power. Additionally, the invention uses an outer tube or "crimping tube" which surrounds the driven shield and is also driven through a coupling technique which reduces the sensitivity of the unit to conductive build up.

Figure 1:
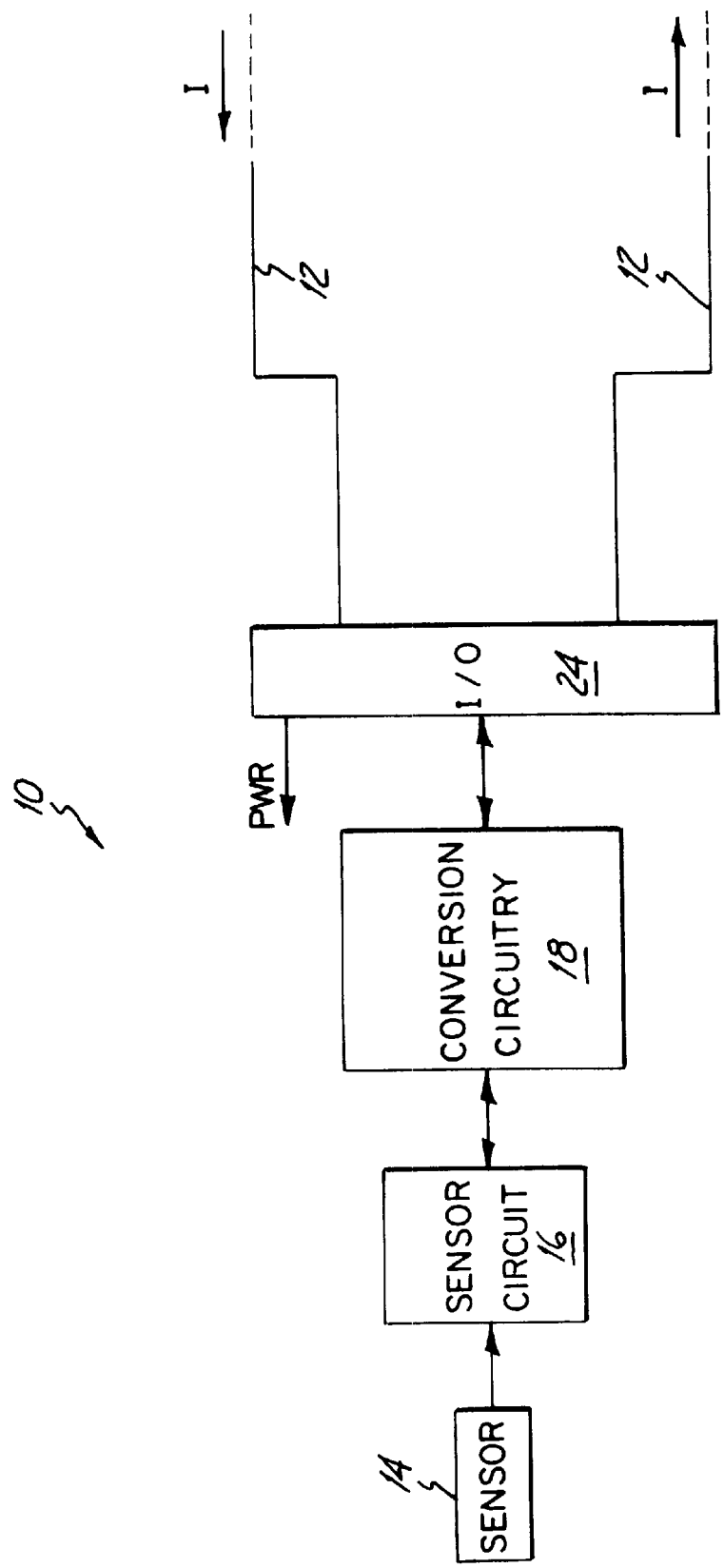
FIG. 1 is a simplified block diagram of a capacitive liquid level sensor in accordance with the present invention coupled to a two wire process control loop.

FIG. 1 is a simplified block diagram of capacitance level sensor 10 in accordance with the present invention. Level sensor 10 couples to a two wire 4–20 mA current loop 12 which carries a current I therethrough. Current I is representative of the level being sensed and also provides power for operation of level sensor 10. Level sensor 10 includes sensor element 14 coupled to sensor circuitry 16 which communicates with a conversion circuitry 18. Conversion circuitry 18 couples to input/output circuitry (I/O) 24 for communication on loop 12. I/O circuitry 24 controls the level of current I flowing through loop 12 and also generates a power output (PWR) in response to this current for powering level sensor 10. The power output (PWR) can wholly power level sensor 10. The example of FIG. 1 is of one embodiment. For example, the present invention does not require a microprocessor for operation. In one embodiment, a current value of 4 mA flowing through loop 12 indicates a dry condition and a current value of 20 mA indicates a wet condition at sensor 14. Note that other communication protocols and techniques and output formats may be used with the present invention.

Figure 2:
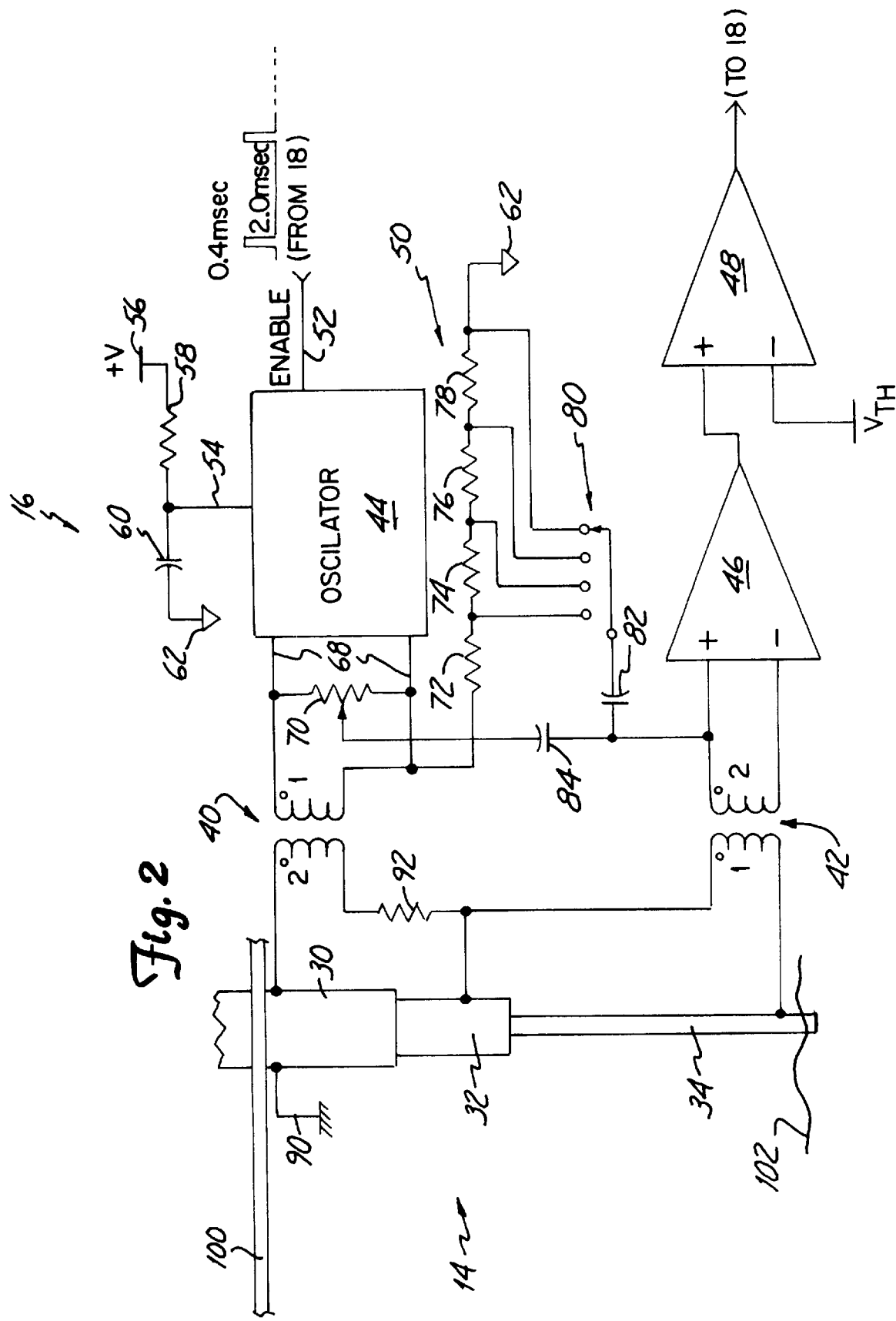
FIG. 2 is a simplified electrical schematic diagram showing sensor circuitry in accordance with the present invention coupled to a level sensor.

FIG. 2 is a simplified diagram of sensor circuit 16 coupled to sensor 14. Sensor 14 includes crimping tube or outer tube 30, driven shield 32 and sensor rod 34. Sensor circuit 16 couples to sensor 14 through transformers 40 and 42. Generally, sensor circuit 16 also includes RF oscillator 44, amplifier 46, comparator 48 and offset resistor network 50.

Oscillator 44 has an enable input 52 which couples to, for example, a power input 54 which couples to a power supply voltage (+V) 56 through a resistor 58. Power input 54 also couples to capacitor 60 which is coupled to circuit ground 62. Oscillator 44 provides a balanced output 68 which is preferably an RF signal having a fundamental frequency of 200 kHz. Output 68 couples to the primary side of transformer 40 and is connected in parallel with potentiometer 70. The primary coil of transformer 40 also couples to offset resistor network 50 which includes resistors 72, 74, 76 and 78 which are connected in series and tapped at four locations which are coupled to four position switch 80. Switch 80 couples to amplifier 46 through capacitor 82 and to the control input potentiometer 70 through capacitor 84. One side of the secondary coil of transformer 40 is coupled to physical ground 90 through outer tube 30. The other side of the secondary coil of transformer 40 couples to driven shield 32 through a buffer resistor 92 and to one side of the primary coil of transformer 42. The other side of the primary coil of transformer 42 couples to sensor rod 34. The secondary coil of transformer 42 couples to differential low impedance inputs of amplifier 46 which provides an output to the non-inverting input of comparator 48. The inverting input of comparator 48 is coupled to a voltage reference $V_{TH}$ and provides a comparator output to I/O circuit 24.

During operation, the oscillator 44 is enabled for 0.4 ms. at a 20 ms. duty cycle such that the primary coil of transformer 40 is driven every 20 ms. with a 0.4 ms. signal having a frequency of 200 kHz. The enable signal may be generated by conversion circuitry 18 or through any appropriate technique which provides pulse generation circuitry. Further, the frequency and duty cycle of the enable signal may be adjusted as appropriate. In one preferred embodiment, the duty cycle is less than 100%. In a further preferred embodiment the duty cycle is less than 50%. In the embodiment set forth herein the duty cycle is only about 2%.

The secondary coil of transformer 40 is connected to earth ground 90 and, through buffer resistor 92 to driven shield 32 and to sensing rod 34 through the primary coil of transformer 42. The secondary coil of transformer 42 connects to amplifier 46 which provides an output to comparator (or digitizer) 48. The output signal from amplifier 46 is directly proportional to the current which flows through the primary coil of transformer 42. The current flowing through the primary coil of transformer 42 depends upon the capacitance (or the conductance if a conductive liquid is being sensed) between the sensing rod 34 and earth ground 90. As the primary coil of transformer 42 has a very low impedance (since it is loaded by a low impedance amplifier), the driven shield 32 and sensing rod 34 are at substantially equipotential.

Assuming that sensor 14 is installed in a vessel 100, and further assuming that the level of liquid 102 is rising such that rod 34 is covered thereby increasing the capacitance between rod 34 and earth ground 90, the input to amplifier 46 from the secondary coil of transformer 42 has a higher voltage level. The output from amplifier 46 is therefore greater than the threshold level set by the threshold voltage $V_{TH}$ causing the output of comparator 48 to go to a high level indicative of a "wet" condition.

Figure 3:
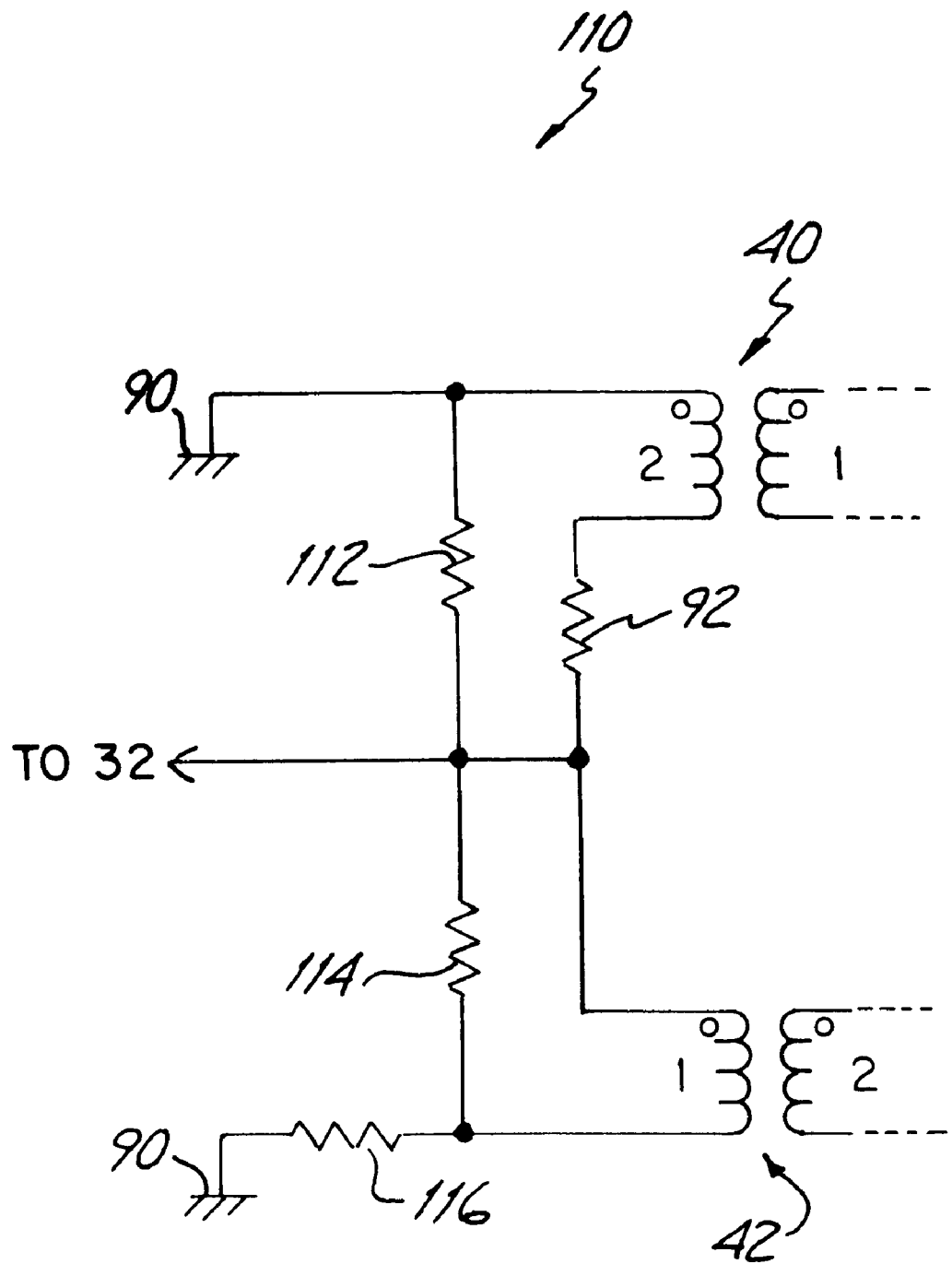
FIG. 3 is a simplified schematic diagram illustrating resistance due to the build up of conductive material on the sensor.

Turning now to an instance in which a conductive coating has built up on the system, a simplified schematic diagram 110 is provided in FIG. 3. In diagram 110, resistor 112 represents the resistance of a conductive coating build up between the driven shield 32 and earth ground 90. Resistor 114 represents the resistance of a conductive coating build up between sensing rod 34 and driven shield 32. Further, resistor 116 represents the resistance of liquid 102 in a wet condition between sensing rod 34 and earth ground 90 (i.e., the wall of vessel 100). The more conductive the coating on sensor 14, the lower the resistance of resistor 112 between driven shield 32 and earth ground 90.

This may eventually cause heavy loading of oscillator 44 for highly conductive coatings. However, oscillator 44 is a gated oscillator and operates in a burst mode in which energy is stored in capacitor 60 (FIG. 2) and used to supply power to oscillator 44. This greatly increases the capability of this system as the coating builds up, without increasing the power required for system operation. As previously mentioned, the power is particularly limited when level sensor 10 is operated through power received only through loop 12. However, if the conductive coating keeps increasing (i.e., the resistance of resistor 112 is much less than the resistance of resistor 92), the signal feeding driven shield 32 will begin to drop because of the redistribution of voltage between resistors 92 and 112. Along with this, the current (IWET) flowing through the primary coil of transformer 42 will also begin to diminish. However, the resistance of the liquid in a wet condition (resistor 116) between sensing rod 34 and earth ground 90 will always be less than the resistance of the conductive coating (resistor 112). Because of this, the current IWET will never drop below the level of a "dry" current as determined by $V_{TH}$. Further, resistor 114 (the resistance between rod 34 and shield 32 due to coating build up) can be ignored because it is shunted by the primary coil of transformer 42 with a very low impedance thus making points A and B virtually equipotential.

Another aspect of the present invention is calibration of circuitry 16. Calibration is achieved using the algebraic addition of two counter-phase signals at the input of amplifier 46. In calibration mode, the first signal is provided through transformer 42 and is representative of capacitance between sensing rod 34 and vessel 100 (i.e., earth ground 90). The second signal is generated directly from oscillator 44 through potentiometer 70. During calibration, potentiometer 70 is adjusted to cancel the capacitance due to the rod 34 and vessel 100 whereby comparator 18 provides a proper "dry" output. Additionally, switch 80 is provided to allow subtraction from the output signal the equivalent of a fixed capacitance value chosen in accordance with the material being sensed. This offset capacitance represents the approximate increase in capacitance between sensing rod 34 and vessel 100 when the level changes from a dry to a wet condition.

In another aspect of the present invention, the exposed portion of sensing rod 34 can be made substantially shorter than in prior art designs. This is possible because of the high sensitivity of the electronics and reduced sensitivity to coating build up.

Figures 4, 5:
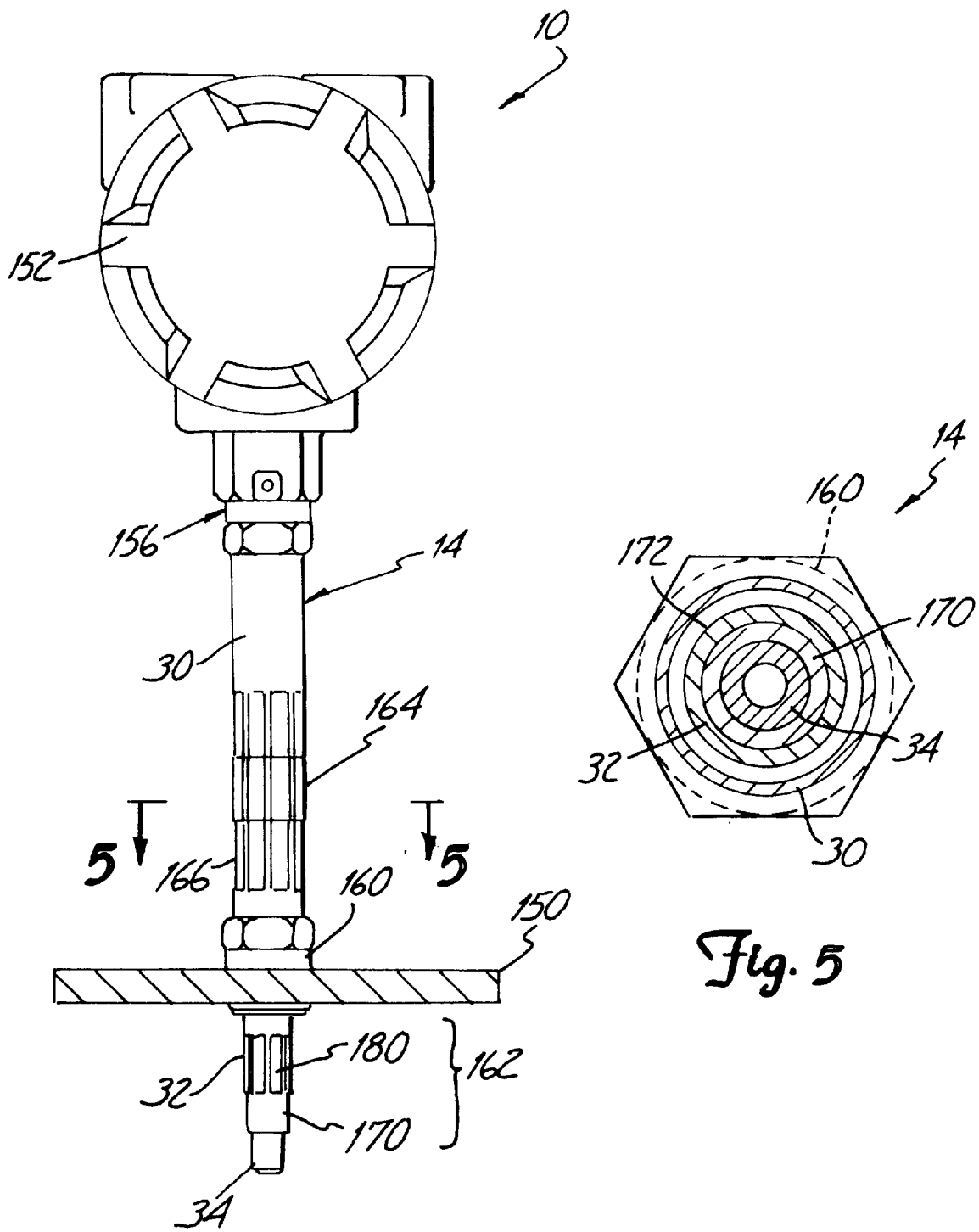
FIG. 4 is a side plan view of capacitive liquid level sensor of FIG. 1.
FIG. 5 is a cross-sectional view of a probe of the capacitive liquid level sensor of FIG. 4 taken along the line labelled 5—5 in FIG. 4.

FIG. 4 is a side plan view of capacitance liquid level sensor 10 which illustrates another aspect of the present invention. Sensor 10 is coupled to vessel housing 150 and includes electronics housing 152 and elongated sensor element or probe 14 coupled at coupling 156. Probe 14 couples to housing 150 at coupling 160. A lower portion 162 of probe 14 extends into the vessel for sensing liquid level. One aspect of the present invention includes a lower portion 162 which is relatively shorter than prior art designs.

FIG. 5 is a cross-sectional view of probe 14 taken along line 5—5 of FIG. 4. As shown in FIG. 5, sensor rod 34 is surrounded by insulating tube 170 preferably made of Teflon or any other insulating material which provides a seal and electrical insulation between rod 34 and driven shield 32. Similarly, insulating tube 172 preferably formed of Teflon separates driven shield 32 from outer tube 30. Turning back to FIG. 4, driven shield 32 is sealed to insulating tube 170 at crimped portion 180. Similarly, outer tube 30 is sealed to insulating tube 172 at crimped portion 166. The expansion collar 164 is then crimped onto crimped portion 166. Although the seal extends over a shorter length, the expansion collar 164 maintains seal integrity over a wide range of pressures and temperatures. Specifically, even an extremely small deformation of the various tubes can significantly reduce the effectiveness of the seal. However, expansion collar 164 compresses the entire assembly thus preventing the tubes, and in particular outer tube 30, from bulging under pressure or temperature as components in the assembly shrink or expand. This is particularly effective to reduce deformation due to the difference between the temperature coefficients of Teflon (about $7.6 \times 10^{-5}$ in/in/f) and stainless steel ($9.6 \times 10^{-6}$ in/in/f). In accordance with this aspect of the present invention, the expansion collar 164 may be any suitable mechanism for maintaining the integrity of the seals to thereby allow a reduction in length of lower portion 162.

The present invention provides a number of advantages over prior art designs including reduced sensitivity to the build up of conductive coatings on the level sensor while maintaining the ability to operate using low power. Further, new calibration and offset techniques are provided for the sensor circuitry. The oscillator is capable of providing signals having increased power levels because the oscillator is gated and only periodically provides a signal with a relatively large storage capacitor providing additional power during operation.

Although the present invention has been described with reference to preferred embodiments, workers skilled in the art will recognize that changes may be made in form and detail without departing from the spirit and scope of the invention. For example, in one embodiment of the invention the output signal is merely a "high" or a "low" output. The output is not limited to the type of outputs which are standard in the process control industry.

What is claimed is:

1. A capacitive level sensor for sensing level of a liquid in a vessel, comprising:
    a sensor coupled to the vessel having a shield and an inner sensing rod, the inner sensing rod forming a capacitance with the vessel and wherein a coating can form on the sensor;
    an oscillator having an enable input and responsively providing an RF output to the shield and the sensing rod and thereby driving the capacitance formed between the rod and the vessel;
    a pulse source periodically providing an enable signal to the enable input of the oscillator to thereby reduce power consumption when a coating has formed on the sensor; and
    comparison circuitry coupled to the rod providing a wet/dry output in response to the capacitance between the rod and the vessel due to the liquid.

2. The capacitive level sensor of claim 1 wherein the RF output couples to the sensing rod through a transformer.

3. The capacitive level sensor of claim 1 including an adjustable calibration signal generated based upon the RF output and coupled to the comparison circuitry.

4. The capacitive level sensor of claim 1 including an offset signal coupled to the comparison circuitry providing an offset to a capacitance signal from the rod, the offset selected based upon the liquid being sent to control the output of the wet/dry output.

5. The capacitive level sensor of claim 1 including an outer tube surrounding the shield and coupled the RF output.

6. The capacitive level sensor of claim 5 including a first transformer having a primary coil coupled to the RF output and a secondary coil coupled between the outer tube and the shield, and a second transformer having a primary coil coupled between the coil and the inner sensing rod and a secondary coil coupled to the comparison circuitry.

7. The capacitive level sensor of claim 1 including input/output circuitry coupled to the comparison circuitry for coupling the capacitive liquid level sensor to a process control loop and responsively providing an output to the process control loop related to the wet/dry output.

8. The capacitive level sensor of claim 7 wherein the capacitive liquid level sensor is completely powered through power received from the process control loop.

9. The capacitive level sensor of claim 8 wherein the process control loop carries a 4–20 mA signal representative of the wet/dry output.

10. The capacitive level sensor of claim 1 wherein the comparison circuitry includes an amplifier coupled to the rod for amplifying an output signal from the rod representative of the capacitance between the rod and the vessel due the liquid and responsively providing an output to a comparator providing the wet/dry output based upon a comparison of the amplifier output and a threshold level.

11. The capacitive level sensor of claim 1 including a seal between the shield and the inner sensing rod and an expansion collar compressing the shield against the inner sensing rod to thereby maintain seal integrity.

12. A capacitive level sensor for sensing level of a liquid in a vessel, comprising:
    a sensor coupled to the vessel having an outer tube surrounding a shield which surrounds an inner sensing rod configured to reduce sensitivity of the sensor to formation of a coating on the sensor;
    an oscillator providing an RF output;
    a first transformer having a primary coil coupled to the RF output and a secondary coil coupled between the outer tube and the shield;
    a second transformer having a primary coil coupled between the shield and the inner sensing rod and having a secondary coil providing a secondary coil output, the primary coil of the second transformer further coupled to the secondary coil of the first transformer to apply the RF output to the sensing rod, wherein the shield and outer tube are configured to reduce sensitivity of the sensor to the formation of the coating on the sensor; and
    comparison circuitry comparing the secondary coil output from the second transformer to a threshold level and responsively providing a wet/dry output as a function of a capacitance between the inner sensing rod and the vessel due to the liquid.

13. The capacitive level sensor of claim 12 wherein the oscillator includes an enable input, the capacitive liquid level sensor further including a pulse source periodically providing an enabling signal to the enable input of the oscillator to thereby control generation of the RF output.

14. The capacitive level sensor of claim 12 including an adjustable calibration signal coupled to the comparison circuitry to calibrate the capacitive liquid level sensor.

15. The capacitive level sensor of claim 12 including offset circuitry coupled to the comparison circuitry for controlling generation of the wet/dry output in response to the secondary coil output from the second transformer.

16. The capacitive level sensor of claim 12 including output circuitry coupled to a two wire process control loop.

17. The capacitive level sensor of claim 16 wherein the capacitive liquid level sensor is wholly powered from power derived from the process control loop.

18. The capacitive level sensor of claim 17 wherein the process control loop carries a 4–20 mA signal representative of the wet/dry output.

19. The capacitive level sensor of claim 12 wherein the comparison circuitry comprises an amplifier coupled to the secondary coil output of the second transformer responsively providing an amplified output to a comparator, the comparator responsively providing the wet/dry output based upon a comparison of the threshold level with the amplified output signal.

20. The capacitive level sensor of claim 12 including a seal which seals the outer tube, shield and inner sensing rod and further including an expansion collar compressing the outer tube against the shield and the shield against the inner sensing rod to thereby maintain seal integrity.

21. The capacitive level sensor of claim 12 wherein the first and second transformers maintain the inner sensing rod and the shield substantially equipotential upon build up of a conductive coating causing a low resistance path between the driven shield and an electrical ground.

* * * * *